United States Patent
Kathail et al.

(10) Patent No.: US 7,840,731 B2
(45) Date of Patent: Nov. 23, 2010

(54) ACCELERATED DATA SWITCHING ON SYMMETRIC MULTIPROCESSOR SYSTEMS USING PORT AFFINITY

(75) Inventors: Pradeep Kathail, Los Altos, CA (US); Kirk Lougheed, Atherton, CA (US); David Barach, Boxboro, MA (US); Philip Winterfield, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1269 days.

(21) Appl. No.: 10/927,571

(22) Filed: Aug. 25, 2004

(65) Prior Publication Data

US 2006/0045078 A1    Mar. 2, 2006

(51) Int. Cl.
    H04L 12/50    (2006.01)
    G06F 3/00     (2006.01)
    G06F 13/00    (2006.01)

(52) U.S. Cl. .................. 710/104; 370/360; 710/1; 711/154

(58) Field of Classification Search .......... 370/357, 370/360, 465; 710/1, 104; 711/154
See application file for complete search history.

(56) References Cited

U.S. PATENT DOCUMENTS

| | | | | |
|---|---|---|---|---|
| 5,222,224 | A * | 6/1993 | Flynn et al. | 711/144 |
| 5,745,778 | A * | 4/1998 | Alfieri | 712/1 |
| 6,038,651 | A * | 3/2000 | VanHuben et al. | 712/21 |
| 6,269,390 | B1 * | 7/2001 | Boland | 718/100 |
| 6,272,522 | B1 * | 8/2001 | Lin et al. | 709/200 |
| 6,484,224 | B1 * | 11/2002 | Robins et al. | 710/305 |
| 2003/0050834 | A1 | 3/2003 | Caplan | |
| 2003/0067930 | A1 * | 4/2003 | Salapura et al. | 370/412 |
| 2003/0200341 | A1 * | 10/2003 | Lynch et al. | 709/250 |
| 2003/0210688 | A1 * | 11/2003 | Basso et al. | 370/389 |
| 2004/0019704 | A1 * | 1/2004 | Sano et al. | 709/252 |
| 2005/0038946 | A1 * | 2/2005 | Borden | 710/310 |
| 2005/0152354 | A1 * | 7/2005 | Abel et al. | 370/389 |

FOREIGN PATENT DOCUMENTS

EP    1 482 685 A1    12/2004
WO    03/045019 A1    5/2003

* cited by examiner

Primary Examiner—Dang T Ton
Assistant Examiner—Ryan C Kavleski
(74) Attorney, Agent, or Firm—Marger Johnson & McCollom, P.C.

(57) ABSTRACT

A router that includes a plurality of processors (SMPs) where there is "affinity" between particular processors and particular interfaces: Each of the router's interfaces are assigned to one of the processors. A packet arriving at a particular interface will be handled by the processor having an affinity to that particular interface. If the packet's egress is on an interface assigned to the same processor, then the output process will also be handled by that processor. If the egress interface has an affinity to a different processor, then the packet is handed over to the other processor for egress. The data structures that must be retrieved from memory to handle a packet are often associated with the interfaces through which the packet passes. Thus, having a particular processor handle all the packets that pass through a particular interface insures that the data structures needed to handle the packets will more likely be stored in the processor's cache and less likely be the object of inter-processor lock contention.

20 Claims, 4 Drawing Sheets

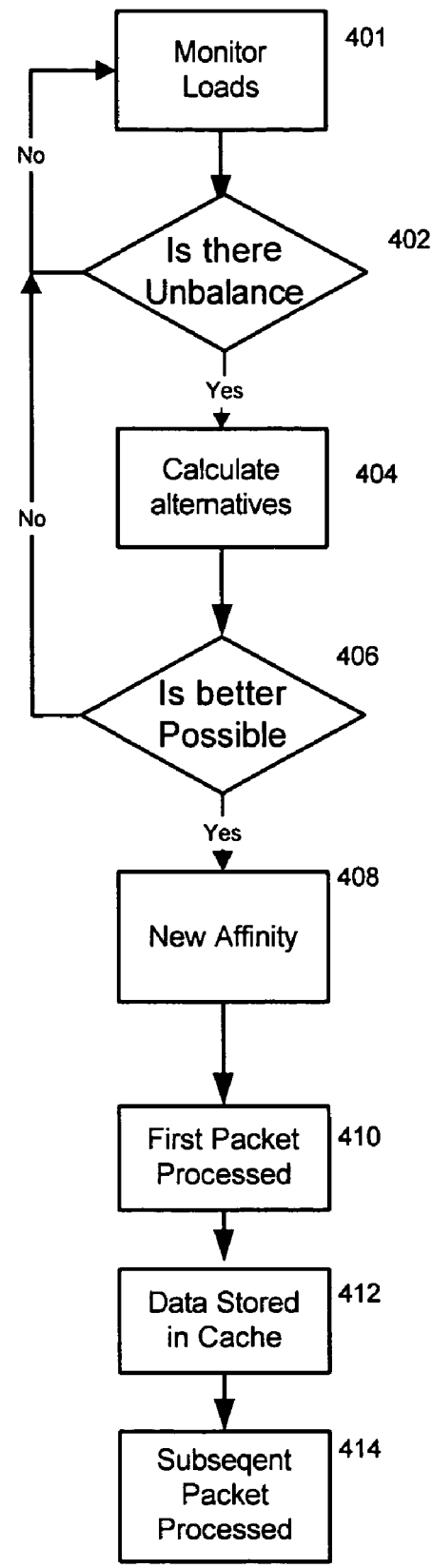

US 7,840,731 B2

ACCELERATED DATA SWITCHING ON SYMMETRIC MULTIPROCESSOR SYSTEMS USING PORT AFFINITY

FIELD OF THE INVENTION

The present invention relates to data communication networks and more particularly to packet routers.

BACKGROUND OF THE INVENTION

Network routers generally include a number of ports or interfaces on which packets are received and transmitted. Handling and directing packets from and to the various ports may be a computational intensive task, depending on the protocols and features enabled on the router. The central processing unit (CPU) in a router must often handle a large work load under heavy traffic loadings.

Instead of just increasing the power of a single CPU, it is possible to have multiple CPUs configured as Symmetric Multiprocessors (SMPs) which work together. SMP systems include a number of CPU's, all of which have access to a shared memory. Generally each CPU in such systems has its own cache (called an L1 cache). Data in the shared memory can be accessed by all the processors; however, data in the L1 cache of a particular processor can only be accessed by that particular processor. The data in the cache must be kept coherent or consistent with respect to shared memory under control of external logic present in the processor complex. These coherency operations are usually expensive (in terms of CPU processing cycles) and should be minimized where possible.

One advantage of SMP systems is that they may execute multiple threads in parallel. A thread (sometimes called an execution context or a lightweight process) is an execution unit of code that implements a flow of control within a programming application. In an SMP system each thread runs independently from the others and multiple threads can be executing at the same time. A scheduler assigns threads to the different processors based on considerations such as CPU availability and the thread's run status. Generally the object is to assign threads to the processors in such a way that all of the processors are kept equally busy or load balanced.

A typical network router has multiple ports on which packets are received and transmitted and a thread could involve the processing steps needed to transfer a packet between a particular set of ports. A thread designed to transfer packets between a particular set of ports must include steps that retrieve information from memory. For example the thread may have to retrieve information about a set ports from memory in order to perform a packet transfer between the particular set of ports.

The processor to which a thread is assigned would generally store data retrieved from memory in its L1 cache. If the scheduler assigned the task of switching the next packet traveling between this same pair of ports to a different processor, the data accumulated in the first processor's cache could not be accessed by the second processor and the data would again have to be again retrieved from the shared memory. A processor that does not have the needed information in its cache could not perform a transfer as quickly as could a processor which has the relevant information in its cache.

SUMMARY OF THE PRESENT INVENTION

The present invention provides a router that includes a plurality of Symmetric Multiprocessors (SMPs) which have "port affinity" between the processors and the various ports in the router. All of router's network interfaces are subdivided into a number of sets. The number of sets equals the number of processors in the system. This division is done manually at setup time and then adjusted based upon a dynamic or heuristic algorithm. One set of interfaces is assigned to each processor.

A packet arriving at a particular interface will be handled by the processor having an affinity to that particular interface. If the packet's egress is on an interface assigned to the same processor, then the output process will also be handled by that processor. If the egress interface has an affinity to a different processor, then the packet is handed over to the other processor for egress.

The data structures that must be retrieved from memory to handle a packet are often associated with the interfaces through which the packet passes. Thus, having a particular processor handle all the packets that pass through a particular interface insures that the data structures needed to handle the packets will more likely to be stored in the processor's cache. This increases the systems performance. In addition, shared data structures required for packet processing may require synchronization methods, such as locks, to maintain data coherency between processors. When these data structures are organized along the lines of port/processor affinity, this decreases the likelihood of expensive lock contention and resolution.

BRIEF DESCRIPTION OF THE DRAWINGS

FIG. 4 is a block diagram illustrating how port affinity to processors is changed.

DETAILED DESCRIPTION

Figure 1:
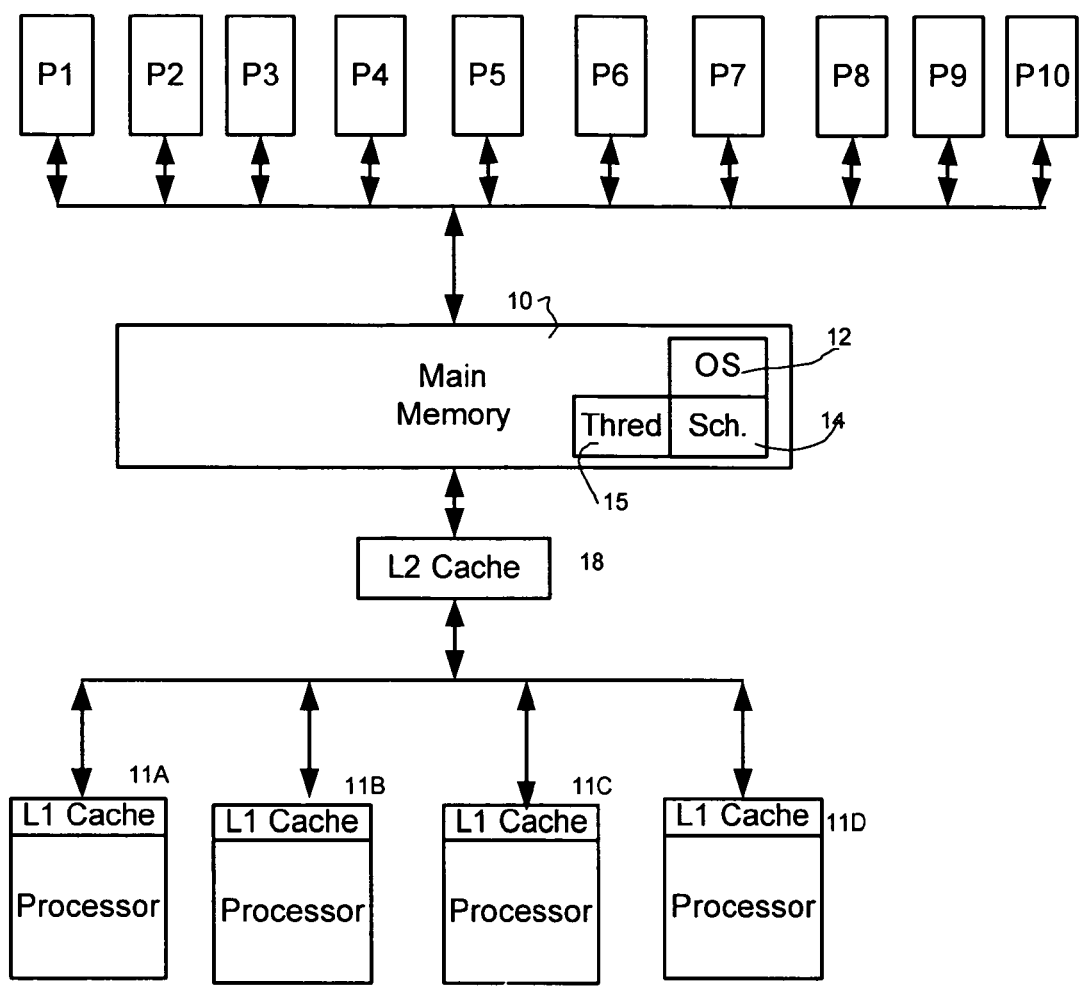
FIG. 1 is an overall system diagram of a first embodiment.

Preferred embodiments of the present invention will now be described with reference to the accompanying drawings. The embodiments shown and described herein are not the only manner that the present invention can be practiced and embodied. This invention may be embodied in many different forms and the inventions should not be construed as being limited to the embodiments set forth herein.

In the drawings, the size of the boxes are not intended to represent the size of physical components. The same reference numerals are used to denote the same elements throughout the drawings.

A block diagram of a first embodiment of the invention is shown in FIG. 1. The first embodiment is a network router that has a number of ports designated P1 to P10. The router may for example be a router designed to route IP data packets that arrive on and are transmitted from ports P1 to P10.

The exact number of ports on the router depends upon the particular installation and the particular application. The particular embodiment shown here has ten ports; however, it should be understood that the number of ports depends upon each particular installation. The system includes a main memory 10. There is a Direct Memory Access (DMA) connection between the ports P1 to P10 and the memory 10. The connection between the ports and the memory 10 is conventional.

The system includes a number of Symmetrical Multiprocessors (SMPs) 11A to 11D. The exact number of processors depends upon the size of the particular system. An embodiment with four processors 11A to 11D is merely shown as an illustrative example. Other embodiments have a different number of processors as needed for the particular application. All of the processors 11A to 11D have access to the memory 10 through an L2 cache 18. Thus, there are shared memories 10 and 18 that all the processors can access and a separate L1 cache memory that is only accessible to the associated processor.

The system is controlled by programs in the memory 10. There is an operating system 12. The operating system 12 includes a scheduler 14. The memory 10 also contains a thread pool 15. The operation system 12 is a conventional SMP operating system. The scheduler 14 directs each particular thread for execution on one particular processor. The present invention is directed to the manner that scheduler 14 schedules threads for execution on the various processors 11A to 11D.

With the present invention, the interfaces P1 to P10 are divided into sets. The number of sets equals the number of processors in the system. The following table illustrates one example of how the ports or interfaces can divided into sets and assigned to the processors.

| Interface sets | Assigned processor |
| --- | --- |
| P1, P2 and P3 | 11A |
| P4 and P5 | 11B |
| P6, P7 and P8 | 11C |
| P9 and P10 | 11D |

The initial assignment is done manually at system set up time. As the system operates, the load on each of the processors is monitored and the assignment is changed to balance the load on the processors. This balancing operation is shown in FIG. 4 and discussed later.

When a packet arrives at a one of the ports, it is stored in the main memory 10 using a normal DMA operation. Once the DMA operation is complete an interrupt is sent to the operating system as is normal in network routers.

After the interrupt is received, the scheduler will schedule a thread to handle the packet. If the packet arrived on interfaces P1, P2 or P3 the thread will be assigned to processor 11A. If the thread arrived at interfaces P4 or P5, the thread will be assigned to processor 11B. If the packet arrived on interfaces P6, P7 or P8 the thread will be assigned to processor 11C. If the packet arrived on interfaces P9 or P10 the thread will be assigned to processor 11D. Since, after the system has been operation for a time, each processor will have handled packets from the same port previously, it is highly likely that data needed to access the port is in the associated processor's cache.

Figure 2:
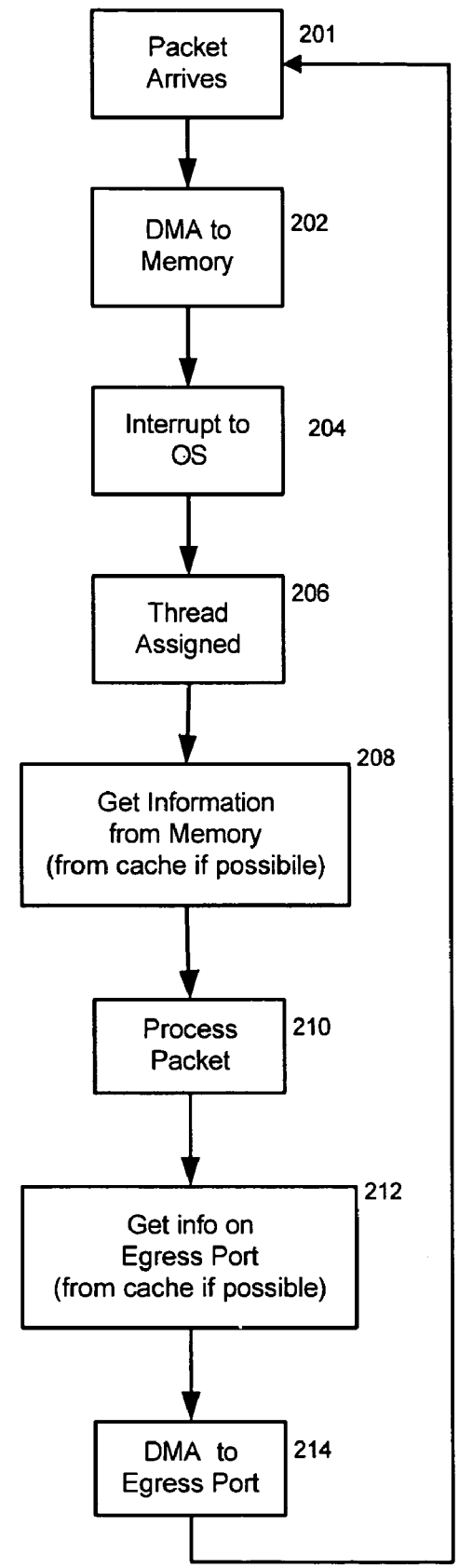
FIG. 2 is a first flow diagram illustrating the operation of the system where both input and egress of a packet is handled by one processor.

FIG. 2 is a block diagram showing an example of how a packet is handled. The process begins when a packet arrives at an interface. In the example shown in FIG. 2, the process begins when a packet arrives at port P7 as indicated by block 201. The first thing that happens is that the packet is sent to the main memory 10 by a DMA operation. This is indicated by block 202.

Upon completion of the DMA operation an interrupt is sent to the operating system as indicated by block 204 to indicate the arrival of the packet. At this point the operating system must decide what thread should handle the packet and the scheduler 14 is notified. In the example given here, since the packet arrived on port P7, the thread for handling the packet is assigned to processor 11C as indicated by block 206.

In order to process the packet, processor 11C will need information concerning the port P7. This information will be obtained from memory 10 as indicated by block 208.

In this example, the packet is destined for port P8. The processor will determine this from the information in the packet (as indicated by block 210). The processor 11C will need information concerning port P7 and it will obtain this information from memory 10. It will finish handling the particular packet s indicated by block 214.

It is noted that at this point the information concerning ports P7 and P8 will be stored in the cache of processor 11C.

The process is repeated when another packet arrives at port P7 as indicated by block 201. For completeness it is noted that in the intervening time, many other packets may have arrived at other ports and these other packets were processed by threads running on the other processors.

When this second packet is processed, the processor will seek the same information about the ports from memory. However, at this point the required information will be in the processor's L1 cache and the operation can proceed more quickly.

When the second packet in this example arrives at port P7 it is sent by DMA into memory 10 as indicated by block 202 and an interrupt is sent to the operating system at indicated by block 244. Again the operating system and scheduler 14 note that the packet was received on port P7, hence, the thread for processing this packet is assigned to processor 11C as indicated by block 206.

At processor 11C, packets from port P7 have been previously processed. Hence when the thread begins operating and the processor needs information concerning the port, it is highly likely that this information is in the processors cache. Thus, the needed information is obtained from the cache as indicated by block 208. The information can be obtained from the processors cache much more quickly than information can be obtained from the main memory 10 and is less likely to be the object of contention with another processor.

The process then continues in this manner. The important point to note is that relevant information needed by the processor is probably in the processor's cache since, similar packets were previously handled by this same processor. Having a particular processor handle all the packets that pass through a particular interface insures that the data structures needed to handle the packets will more likely be stored in the processor's cache and less likely be the object of inter-processor lock contention.

The size of the L1 caches in the processors need be coordinated with the number of parts which have an affinity for each processor. If the cache is too small, it will be less likely that the needed information is in the processor's cache.

Figure 3:
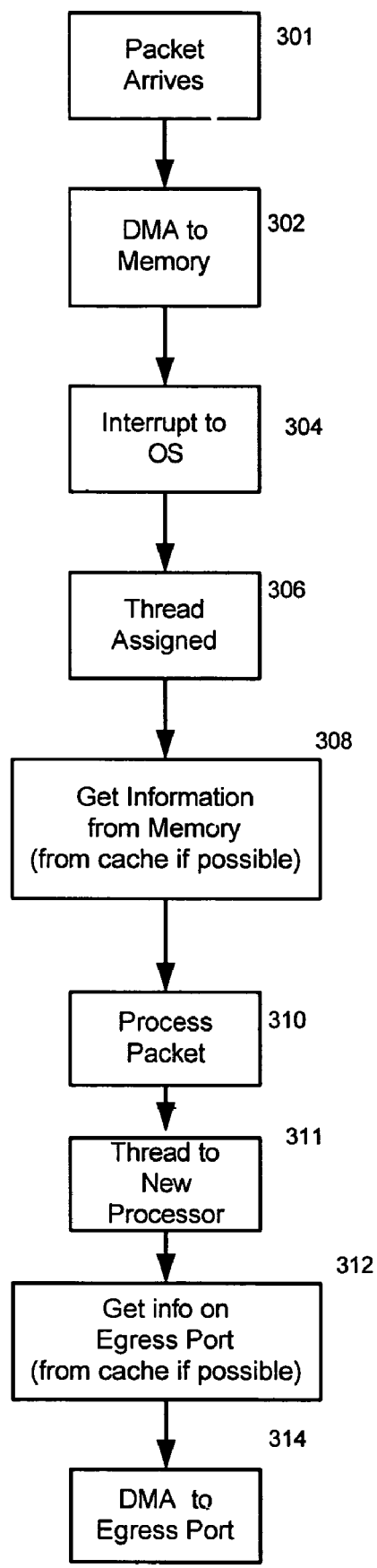
FIG. 3 is a first flow diagram illustrating the operation of the system where the input and egress of a packet are handled by different processors.

FIG. 3 provides an example of what occurs when a packet arrives at a port assigned to one processor and the egress of that packet is at a port assigned to a different processor.

The process begins when a packet arrives at a port. In this example the packet arrives at port P2 as indicated by block 301. The packet goes into memory 10 by means of a DMA operation which is normal as indicated by block 302. After the packet is in memory, an interrupt is sent to the operating system as indicated by block 304. The operating system realizes that the packet has entered via port P2 and hence the thread to process the packet is assigned to processor 11A as indicated by block 306. The appropriate information is obtained from memory as indicated by block 308. As previously explained, this information will probably be in the processor's cache.

For the particular packet being illustrated in this example, the egress is at port P9. This is determined as the packet is being processed as indicated y block 310. It is noted that in the example being described here, port P9 has an affinity to processor 11D. This is shown in the table given above.

Thus, for the particular packet being illustrated, the port on which the packet arrived has an affinity to processor 11A; however, the egress of the packet is on a port that has an affinity to processor 11D. The thread for handling the egress of the packet must therefore be assigned to processor 11D. After the system has been operating for some time, processor 11D will have stored in its cache data necessary to handle port P9 and thus that data will not have to be obtained from the main memory.

For this example the thread is handed off as indicated by block 312. That processor gets the necessary information which probably is in its cache and it sends the packet to the appropriate port as indicated by block 314.

As indicated above, the first time that a processor accesses a particular port, it will need to get information from the main memory 10 (a relatively slow operation); however, when it later accesses this same port the required information will probably be in the processor's cache and it can be accessed more quickly. Thus, there is an advantage of having processor port affinity.

The affinity between ports can be initially set manually; however, as the system operates, the affinity can be adjusted on a dynamic basis. That is, the load on the various processors can be monitored and the affinity of ports to processors can be adjusted to keep the load relatively balanced.

It is noted that the affinity of ports to processors should only be changed at a relatively slow rate. The reason for this is that each time, the affinity between a processor and a port is changed, the next time a packet from that port is processed, the appropriate information will not be in the assigned processor's cache. Naturally, this will only be the situation for the first packet processed by the newly assigned processor.

FIG. 4 is a flow diagram showing how the affinity of ports to processors can be adjusted. It is noted that the example given here is a relatively simple example. The adjustment process can use a much more complicated algorithm so that the adjustment will be more appropriate and optimized.

As indicated by blocks 401 and 402, the load is monitored to determine if there is an unbalance between the load on the various processors. An appropriate threshold of unbalance, calling for action, will be established at set up time. If there is an unbalance (as indicated by block 404) the balance resulting from various changes in the affinity is calculated to determine if a new arrangement will be better than the one in place at that time. This is indicated by block 406.

If a new arrangement is possible as indicated by block 408, threads are thereafter assigned based on the basis of this new affinity.

Block 410 indicates that the first packets processed under the new affinity will be processed relatively slowly, as data will have to be retrieved from the main memory 10. However, the data from the first packet processed will be stored in the processor's cache as indicated by block 412. Subsequent packets can then be processed more quickly as indicated by block 414.

It is noted that only those parts of the various units that are relevant to the present invention have been shown and described. It should be understood that the units shown include all the parts and elements normally in such units as is known in the art.

The above description relates to threads that transfer packets to and from the various interfaces. Threads that perform other function can be merely assigned so as to balance the load on the processors.

It is also noted that the term interface as used herein is intended to mean a port or other mechanism through which a packet arrives at or leaves a network router or other device. A thread is interface related if during the execution of the thread information is required from memory concerning a particular port. Thus, a thread is related to a particular interface if it requires information from memory concerning the particular interface. The required information may either be in the memory shared by the processors or in the cache of a particular processor.

While the invention has been shown and described with respect to various embodiments thereof, it should be understood that various changes in form and detail are possible without departing from the spirit and scope of the invention. The scope of the invention is limited only by the appended claims.

We claim:

1. A network router, comprising:
   a symmetric multiprocessor (SMP) system that includes a plurality of processors for processing threads to route data packets, each of said processors having a cache memory;
   a plurality of separate and adjustable interface sets that each includes a plurality of interfaces configured to receive and transmit said data packets, each of said interface sets being assigned to a particular one of said processors such that each of said processors has only one interface set assigned thereto, said plurality of interface sets comprising a first interface set assigned to a first one of said processors and a second interface set assigned to a second one of said processors, said first interface set including at least a first of said interfaces and a second of said interfaces, and said second interface set including at least a third of said interfaces, a fourth of said interfaces, and a fifth of said interfaces,
   wherein said interface sets are configured to be adjusted such that one of said third, fourth, and fifth interfaces is transferred from said second interface set to said first interface set to balance a load on at least one of said first and second processors; and
   an operating system that includes a scheduler which assigns said threads to particular processors, said scheduler assigning each of said threads for the routing of at least one of said data packets from a particular interface to a particular processor to which a particular interface set which includes that particular interface is assigned.

2. The router recited in claim 1 wherein said data packets are IP packets.

3. The router recited in claim 1 including a main memory.

4. The router recited in claim 3 wherein said ports communicate with said memory via direct memory access (DMA).

5. The router cited in claim 3 wherein the cache in each processor is an L1 cache and wherein there is an L2 cache located between said L1 cache and said memory.

6. The router recited in claim 1 where at least one of said interface sets is adjusted as the system operates.

7. The router recited in claim 1 wherein the number of interfaces is greater than the number of processors.

8. The router recited in claim 1 wherein said interface sets are initially established manually at system setup time.

9. A method of assigning threads to processors in a symmetrical multiprocessing system that includes a number of processors and a number of separate and adjustable interface sets that each includes a number of interfaces, said threads being interface related, said method comprising:

assigning each of said interface sets to a particular one of said processors such that each processor has only one interface set assigned thereto, said assigning comprising:

assigning a first of said interface sets to a first of said processors, said first interface set including a first of said interfaces and a second of said interfaces, and assigning a second of said interface sets to a second of said processors, said second interface set including a third of said interfaces, a fourth of said interfaces, and a fifth of said interfaces;

adjusting said first and second interface sets such that one of said third, fourth, and fifth interfaces is transferred from said second interface set to said first interface set to balance a load on at least one of said first and second processors; and assigning threads to particular processors depending upon the assignments of the interface sets to the processors.

10. The method recited in claim 9 wherein each interface set is initially set at setup time and then later adjusted to balance the load on said processors.

11. The method recited in claim 10 wherein each of said processors includes a cache that the processor can access, wherein information required to process a thread is frequently in the processor's cache.

12. The method recited in claim 10 wherein said method is practiced in a network router.

13. The method recited in claim 10 wherein said interfaces receive or transmit packets.

14. A network router, comprising:

a plurality of reconfigurable interface sets that each includes a plurality of interfaces for receiving or transmitting data packets;

a plurality of processors for processing threads to route said data packets, each of said processors having a cache memory;

each of said threads being related to at least one of said interfaces;

each of said interface sets being assigned to a particular one of said processors;

each of said interface sets being configured to be adjusted such that at least one of said interfaces related to a particular one of said interface sets can be transferred from said particular one of said interface sets to another of said interface sets so as to balance a load on at least one of said processors to which at least one of said particular one of said interface sets and said other of said interface sets is assigned; an operating system that includes a scheduler which assigns threads to particular processors, said scheduler being adapted to assign each particular thread to a particular processor based on the assignment of the interface set that includes the interface related to the particular thread to the particular processor, wherein data for handling a particular thread is in the cache of the processor to which the thread is assigned.

15. The router recited in claim 14 wherein said data packets are IP packets.

16. The router recited in claim 14 including a main memory which is accessible to all of said processors.

17. The router recited in claim 16 wherein said interfaces communicate with said main memory via direct memory access (DMA).

18. The router cited in claim 16 wherein the cache in each processor is an L1 cache and wherein there is an L2 cache located between said L1 cache and said main memory.

19. The router recited in claim 14 where at least one interface set is changed as the system operates.

20. The router recited in claim 14 wherein at least one of said data packets arrives at an interface of one of said interface sets and has an egress at an interface of another of said interface sets.

* * * * *